A. S. TOWERS.
PROPELLING MECHANISM.
APPLICATION FILED NOV. 21, 1918.
1,319,540.
Patented Oct. 21, 1919.
2 SHEETS—SHEET 2.
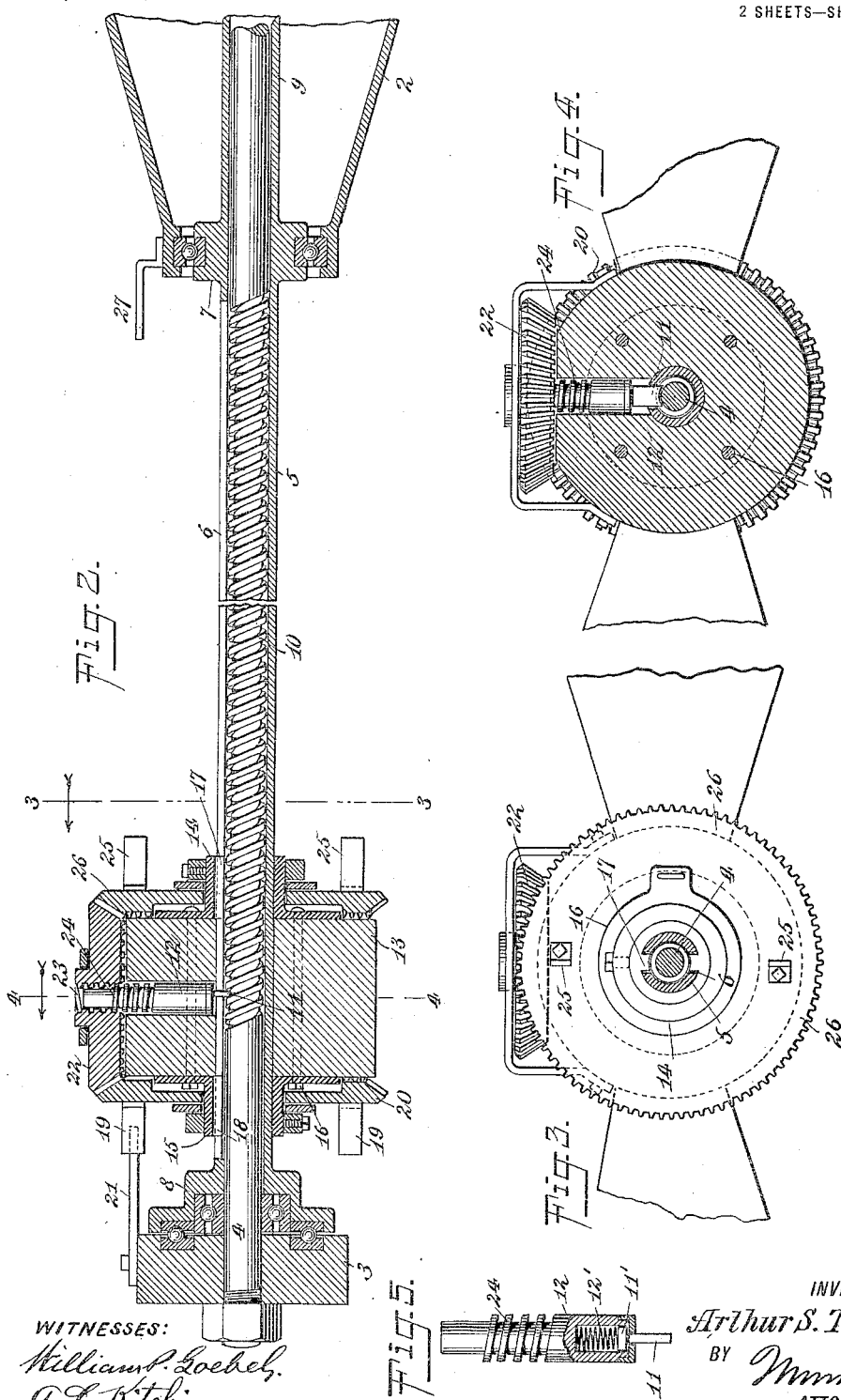
WITNESSES:
William P. Goebel
A. L. Kitchin
INVENTOR
Arthur S. Towers.
BY
ATTORNEYS

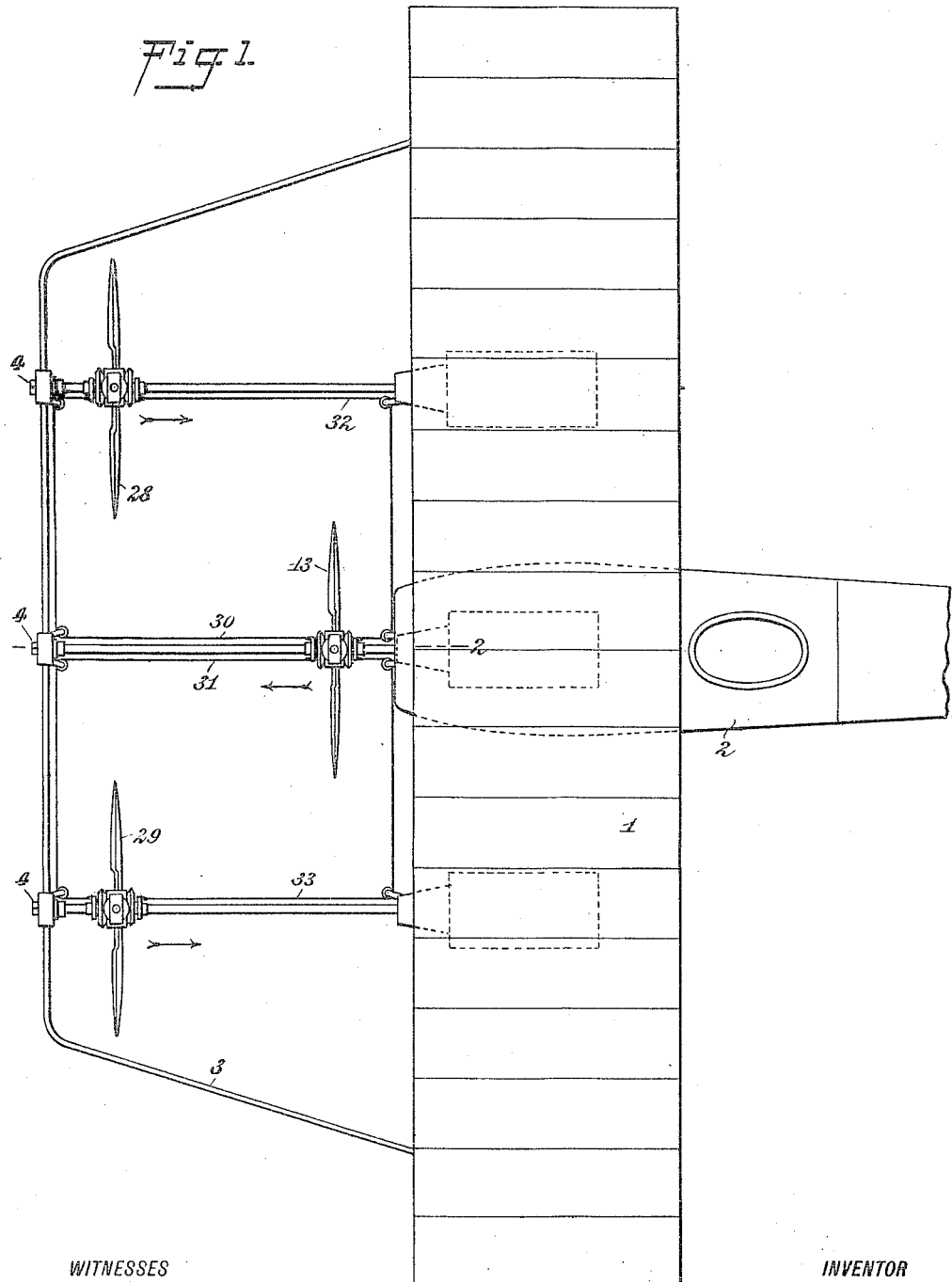

UNITED STATES PATENT OFFICE.

ARTHUR S. TOWERS, OF HARTFORD, CONNECTICUT.

PROPELLING MECHANISM.

1,319,540.      Specification of Letters Patent.      Patented Oct. 21, 1919.

Application filed November 21, 1918. Serial No. 263,516.

*To all whom it may concern:*

Be it known that I, ARTHUR S. TOWERS, a citizen of the Dominion of Canada, and a resident of Hartford, in the county of Hartford and State of Connecticut, have invented a new and Improved Propelling Mechanism, of which the following is a full, clear, and exact description.

This invention relates to propelling devices for airplanes, ships and other devices and has for an object the provision of an improved construction wherein the propelling force of the rotating propeller is utilized in addition to the pull against the air by the propeller blades moving quickly in the opposite direction to the direction of flight.

Another object of the invention is the provision of a mechanism for moving a propeller back and forth longitudinally of a given shaft while it at the same time rotates and uses said shaft as an axle.

A further object of the invention is the provision of a propelling mechanism for airplanes wherein one or a plurality may be used connected together whereby all of the propellers will rotate simultaneously, but will move longitudinally of their supporting shafts in different directions so that there will be a balanced effect to the pull of the various propellers.

In the accompanying drawings:

Figure 1 is a top plan view of a conventional airplane with an embodiment of the invention applied thereto.

Fig. 2 is an enlarged detail sectional view through Fig. 1 approximately on line 2—2.

Fig. 3 is a transverse sectional view through Fig. 2 on line 3—3.

Fig. 4 is a sectional view through Fig. 2 on line 4—4.

Fig. 5 is a detail fragmentary view, partially in section, showing the mechanism of one of the controlling members embodying the invention.

Referring to the accompanying drawings by numerals, 1 indicates an airplane of any desired kind provided with a body or fuselage 2 of any desired construction. Connected with the airplane 1 is a frame or brace 3 for receiving the outer end of various bars or shafts 4, said shafts extending into the body 2 where they are secured rigidly in position so as not to rotate. Arranged on each shaft 4, as shown in Fig. 2, is a tubular shaft 5 having a slot 6 extending longitudinally thereof from the bearing member 7 to the bearing member 8, bearing member 7 being provided with suitable balls carried by part of the body 2 while bearing member 8 coacts with balls acting on the frame 3. These balls provide for easy rotation of the shaft and at the member 8 are arranged so as to act as thrust bearings. Shaft 5 is connected adjacent the point 9 with the engine or any suitable driving force whereby the hollow shaft is rotated at any desired speed, while the shaft 4 is held stationary. Shaft 4 is provided with threads 10, which if desired may be steep for producing quick action. The threads 10 coact with the projection 11 of a stub shaft 12 loosely mounted in the hub of propeller 13. The propeller 13 has hubs 14 and 15 rigidly secured thereto by any suitable means, as for instance by bolts 16 whereby the propeller 13 is rotated with the members 14 and 15, and as members 14 and 15 are splined to the shaft 5 the propeller will be rotated by shaft 5. The splines or sliding keys 17 and 18 fit into groove 6 so that when the projection or lug 11 is engaging the threads 10 while shaft 5 is rotated the propeller 13 will be moved inward or toward the engine. It will be noted that the propeller will be rotating and acting in the usual manner of propellers as the blades thereof will be engaging the air in the usual manner so as to give a forward pulling movement to shafts 4 and 5. This pulling movement urges the airplane forward notwithstanding the fact that the propeller is traveling forward also at a faster rate than the airplane. When the parts have reached substantially their extreme forward position as shown in Fig. 2, one of the projections 19 on bevel gear 20 will strike a stop 21 on the frame 3 and will stop the rotation of the gear 20 which will result in the rotation of gear 22. Gear 22 is provided with a threaded bore 23 engaging the threads 24 on shaft 12, and when the gear 22 begins to rotate it will act on threads 24 for moving the same and the entire shaft 12 toward the threads 10 so that before the stop 21 can strike against the gear wheel 20, the projection 11 will be engaging the threads 10 and consequently the propeller, though continually rotating will be pulled or forced rearwardly toward the body 2 until the projection 25 and gear wheel 26 has engaged the stop 27 on the body 2 whereupon gear wheel 26 will be stopped from rotation and rotate the gear wheel 22 in the opposite direction for causing the shaft 12 and the projection 11 to move away from threads 10 whereupon the blades of the propeller acting on the air will automatically and quickly move the propeller forward to the position shown in Fig. 2 after which the action is repeated and is continually repeated as long as the device is in use. In this manner the usual effect of the forward pulling of the propeller is secured and in addition the action of a substantially flat surface, for instance the blades of the propeller against the air in a horizontal movement. This action gives a direct pull on the propeller against the air so as to urge the airplane forward in addition to the pull of the propeller against the air.

As shown in Fig. 1 there is provided three propellers, namely 13, 28 and 29, a greater or less number of propellers could be used, but preferably three or more are used rather than two, as such an arrangement will balance up the action of the propellers in a better manner. The propellers are arranged so that as propeller 13 is moved forward the propellers 28 and 29 are moved rearwardly. To cause all the propellers to operate simultaneously and not to get out of step cables 30 and 31 connect the propeller 13 with propellers 28 and 29, said cables passing over suitable guiding pulleys mounted on frame 3. Oppositely positioned cables 32 and 33 are provided which connect the opposite sides of propellers 13 and 28 with propellers 13 and 29 respectively, said last mentioned cables passing over suitable pulleys whereby the movement of the propellers in their back and forth traveling are synchronized.

In Fig. 5 will be seen a detail view showing the interior of member 12 which is constructed to prevent accidental jamming of the extension 11, which extension is provided with a head 11' acting on the spring 12' whereby any downward movement of the shaft 12 in excess of that necessary will be taken up by the spring 12' and thereby avoid pressing the extension 11 against the threads 10 unnecessarily.

What I claim is:

1. A propelling device comprising a propeller, a stationary threaded shaft, a hollow shaft surrounding the stationary shaft formed with a slot therein, a propeller arranged on said hollow shaft, a reciprocating member carried by the propeller and formed with an extension, means for moving said reciprocating member and extension into and out of engagement with the threads on said threaded member, and stops for guiding said means arranged adjacent each end of said threaded shaft so that the propeller will automatically move back and forth longitudinally of the threaded shaft while being rotated.

2. A propelling mechanism for air-planes, ships and the like comprising a propeller having blades of substantially the usual shape, a propelling shaft connected to a prime mover loosely extending through said propeller, said shaft having a slot for substantially its full length, a stationary shaft extending through said movable shaft, said stationary shaft being threaded, a key connected with said propeller extending into said slot whereby as the hollow shaft is rotated the propeller will be rotated, a projection carried by said propeller and adapted to be moved into and out of engagement with the threads of said shaft, and means for automatically moving said projection into and out of engagement with said threads whereby as said shaft rotates the propeller will be rotated and be moved back and forth longitudinally in one direction by the action of the medium by which the propeller is operated and in the opposite direction by the action of said threads and said projection.

3. In a propelling mechanism for air-planes, a hollow driving shaft having a slot therein, a stationary shaft provided with threads for substantially the full length of the slot in the driving shaft, said stationary shaft being positioned in said driving shaft, a propeller loosely mounted on said driving shaft, said propeller being formed with a key extending into said slot whereby the propeller may slide along the propelling shaft but must rotate therewith, a reciprocating member formed with an extension adapted to extend through said slot and engage the threads on said stationary shaft, a gear wheel acting as a nut connected with said reciprocating member for moving the same back and forth and causing said extension to engage and disengage said threads, a pair of loosely mounted gear wheels meshing with the first mentioned gear wheel, a projection arranged on each of said second mentioned gear wheels, and a stop arranged adjacent each end of said tubular shaft positioned to engage said extension, and stop the rotation of the respective loosely mounted gear wheels whereby as the propeller continues to rotate the gear wheel acting as a nut will be rotated and the reciprocating member will be moved so that the projection thereof will be disengaged from said threaded shaft or will be caused to engage said threaded shaft according to the particular loosely mounted gear wheel arrested.

ARTHUR S. TOWERS.